March 11, 1952     H. DA COSTA     2,588,807

CHANGE-SPEED FRICTION DRIVE FOR RECORD CHANGERS

Filed Feb. 27, 1951     3 Sheets-Sheet 3

Inventor:-
Harry Da Costa
By: William E. J. Boyj
Attorney.

Patented Mar. 11, 1952

2,588,807

UNITED STATES PATENT OFFICE 2,588,807

CHANGE-SPEED FRICTION DRIVE FOR RECORD CHANGERS

Harry da Costa, Snaresbrook, England, assignor to The Plessey Company Limited, Ilford, England, a British company Application February 27, 1951, Serial No. 212,921
In Great Britain March 30, 1950

5 Claims. (Cl. 74—199)

This invention relates to a change speed friction drive for record changers.

Gramophone records commonly known as "long playing" or "microgroove" records are now being manufactured, as well as the conventional type of record. In order to be able to play these various kinds of records upon a conventional record changer, it is necessary to vary the speed of the turntable; at least three different speeds are required to drive all three types of herein mentioned records.

An object of the invention is to provide a change speed friction drive wherein an actuating mechanism transmits linear movement to a ramp.

Another object of the invention is to provide a stepped ramp for moving vertically a carrier device.

Other objects of the invention and the nature thereof will become apparent from the following description considered in connection with the accompanying figures of the drawing and wherein like reference characters describe elements of similar function therein and wherein the scope of the invention is determined rather from the dependent claims.

Figure 1:
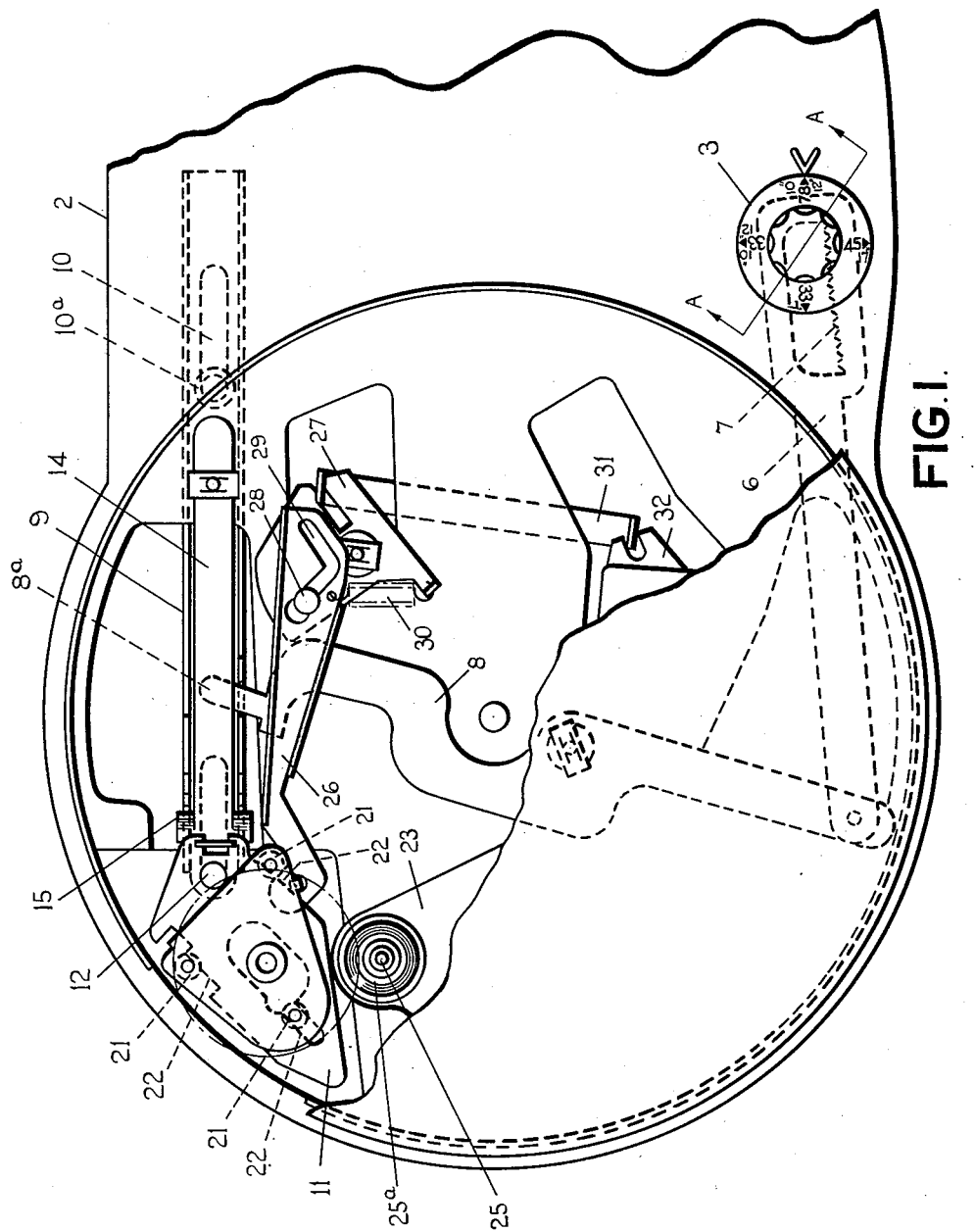
Fig. 1 is a plan of a three speed drive at the "off" position.

Referring to the drawings.

Figure 4:
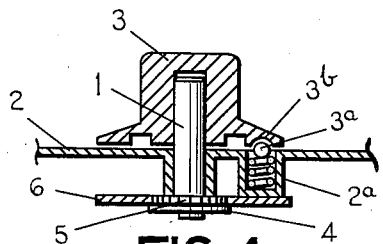
Fig. 4 is a detail of a manual control.
Figure 5:
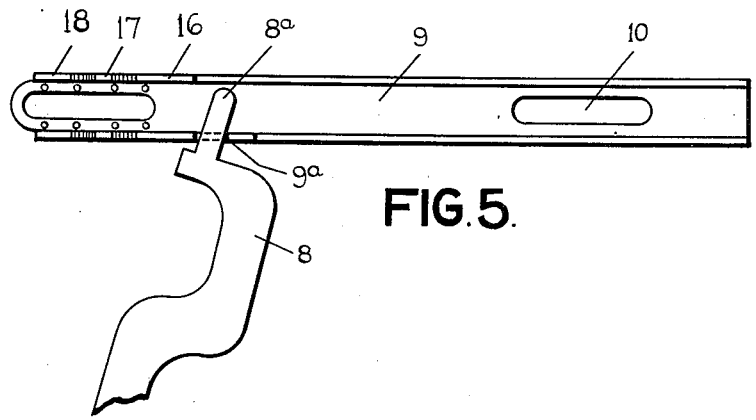
Fig. 5 is a detail of the ramp.

A vertical shaft 1, rotatably mounted in the base plate 2 is fitted with a knob 3 having spaced numeral markings "33" "45" and "78" thereon, and a flanged collar 4 and toothed wheel 5 is fixed to the shaft beneath the base plate 2; a lever 6 having at one end a ratchet slot 7 engaging with the toothed wheel 5 and the opposite end is pivoted to a crank 8 mounted upon the base plate 2. A spring loaded ball 3ª located in a hub 2ª abuts against the upper face of lever 6 and the ball 3ª rides over the underface of the knob 3 and clicks into spaced notches 3ᵇ (Fig. 4) to indicate when the lever 6 is in a position which corresponds to the markings on knob 3.

Figure 6:
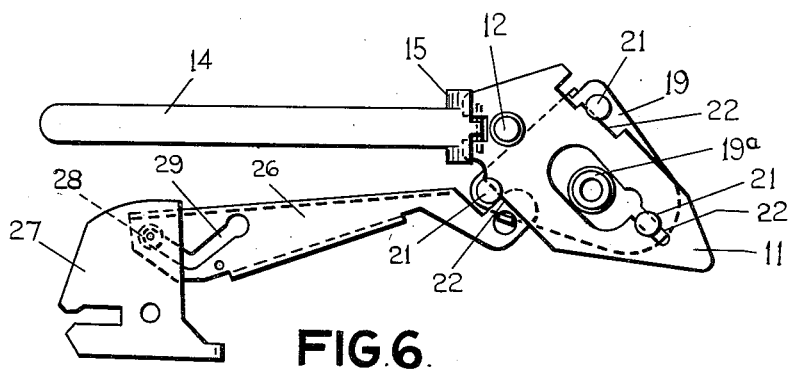
Fig. 6 is an underside view of the platform assembly.

A ramp 9 has a slot 10 to receive a pin 10ª fixed to the underside of the base 2 whereby said ramp can slide linearly. The crank 8 is formed with a tongue 8ª which passes through a slot 9ª in one of the upstanding edges of the ramp 9. A slotted platform 11 has a downwardly extending shaft 12 which slides in a vertical bearing 13 on the lower face of the base 2 to permit the platform 11 to move vertically. A spring blade 14 fixed to the base 2 is formed with skis 15 and coupled to the platform 11, said skis 15 are aligned with the stepped edge portions 16, 17, 18 of the ramp 9 in such a manner that when the ramp 9 moves linearly, the spring blade 14 presses the skis 15 on to the stepped portions 16, 17, 18, thereby causing the platform to move vertically. A carrier plate 19 having a downwardly extending hub 19ª to support a jockey pulley 20 is slidably mounted upon the slotted platform 11 by means of studs 21 fixed to the carrier 19 moving in guides 22 on said platform 11. (See Fig. 6.)

An electric motor 23 secured to the underside of the base 2 has its shaft 24 tangentially disposed to a jockey pulley 20. The upper end 25 of the shaft 24 is reduced to provide a drive of 33 R. P. M.; below the reduced portion of the shaft 24 itself provides a drive of 45 R. P. M. and a pulley 25ª is fixed to the shaft 24 to provide a drive of 78 R. P. M.

Figure 2:
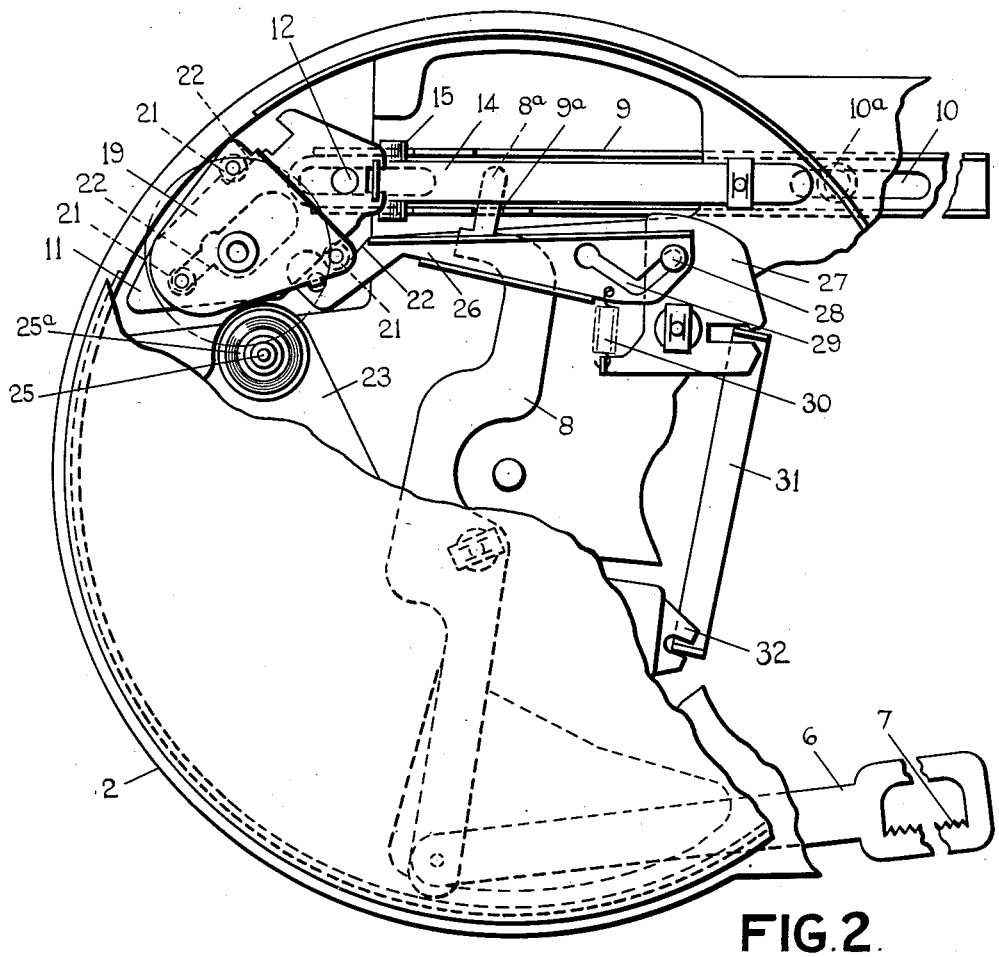
Fig. 2 is a similar view to Fig. 1 showing the "drive" position.
Figure 3:
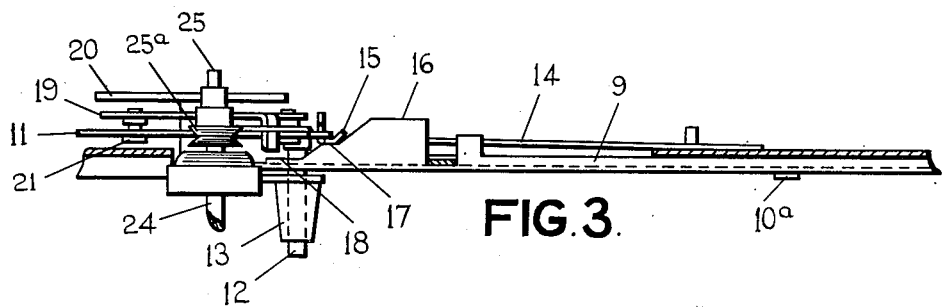
Fig. 3 is a side elevation of the ramp assembly.

A member 26 is pivotally attached to one edge of the carrier plate 19 also to a latch plate 27 through a grooved pin 28 sliding in a V-shaped slot 29. Said member 26 is connected to the latch plate 27 by a spring 30 to retain the grooved pin 28 at the respective ends of the slot 29. A bar 31 is loosely connected to the member 27 and a switch arm 32 respectively as shown in Figs. 1 and 2. To revolve a gramophone turntable at a given speed, the knob 3 is turned to the selected speed, for example 45 R. P. M. when the platform 11 through ratchet lever 6 and crank 8 moves the ramp 9 linearly on to the intermediate step 17, whereby the jockey pulley 20 is raised or lowered, as the case may be, to engage with the portion of shaft 24 below the reduced end as shown in Fig. 3. In the "off" position (Fig. 1) jockey pulley 20 is held out of engagement with the driving pulleys through the member 26 being moved rearwardly by reason of the fact that, when the switch arm 32 is moved to the "off" position, the bar 31 turns the latch plate 27, causing the pin 28 to slide in the V-shaped slot 29, thereby withdrawing the carrier 19. When the switch arm 32 is moved to the "on" position, a reverse operation takes place, when the jockey pulley 20 engages the shaft 24. The helical spring 30 retains the member 26 in the extreme position to which it has previously been moved.

I claim:

1. In a record changer, a change speed friction drive, the combination of a base plate, a ramp slidably supported on the base, an actuating mechanism fitted to the base plate for transmitting linear movement to the ramp, said mechanism constituting a control knob, a link connected to said control knob through a ratchet device and a crank pivoted to the link projects into a slot provided in said ramp, a platform in a bearing on the base plate, said ramp moving the platform vertically, a carrier plate sliding on said platform, a jockey pulley on said carrier, mechanical means for transmitting horizontal motion to the carrier plate and a variable speed driving pulley in the base plate engaged by said jockey pulley.

2. In a record changer, a change speed friction drive, the combination of a base plate, a stepped ramp slidably supported on the base, an actuating mechanism fitted to the base plate for transmitting linear movement to the ramp, said mechanism constituting a control knob, a link connected to said control knob through a ratchet device and a crank pivoted to the link projects into a slot provided in said ramp, a vertically movable platform in a bearing on the base plate, skis attached to the platform contacting the ramp, a carrier plate sliding on said platform, a jockey pulley on said carrier, mechanical means for transmitting horizontal motion to the carrier plate and a variable speed driving pulley in the base plate engaged by said jockey pulley.

3. In a record changer a change speed friction drive, the combination of a base plate, an actuating mechanism fitted thereto, a stepped ramp slidably supported on the base plate, said actuating mechanism transmitting linear movement to the ramp, a vertically movable platform in a bearing on the base plate, skis attached to the platform contacting the ramp, a carrier plate sliding on said platform, a jockey pulley on said carrier, mechanical means for transmitting horizontal motion to the carrier plate and a variable speed driving pulley in the base plate engaged by said jockey pulley.

4. In a record changer, a change speed friction drive, the combination of a base plate, a stepped ramp slidably supported on the base, an actuating mechanism fitted to the base plate for transmitting linear movement to the ramp, said mechanism constituting a control knob, a link connected to said control knob through a ratchet device and a crank pivoted to the link projects into a slot provided in said ramp, a vertically movable platform in a bearing on the base plate, skis attached to the platform contacting the ramp, a carrier plate sliding on said platform, a jockey pulley on said carrier, mechanical means for transmitting horizontal motion to the carrier plate, a spring means associated with the mechical means for maintaining same in alternate positions, and a variable speed driving pulley in the base plate engaged by said jockey pulley.

5. In a record changer a change speed friction drive, the combination of a base plate, an actuating mechanism fitted thereto, a stepped ramp slidably supported on the base plate, said actuating mechanism transmitting linear movement to the ramp, a vertically movable platform in a bearing on the base plate, skis attached to the platform contacting the ramp, a carrier plate sliding on said platform, a jockey pulley on said carrier, a member mounted upon the base plate through a pin and slot means, a latch plate rotating on the base plate connected to the member and a drag link connected to said latch member and to an electrical switch respectively whereby the carrier slides on the platform upon actuation of the switch for moving the jockey pulley relative to the variable speed pulley.

HARRY DA COSTA.

REFERENCES CITED

The following references are of record in the file of this patent:

UNITED STATES PATENTS

| Number | Name | Date |
| --- | --- | --- |
| 2,260,289 | Brady et al. | Oct. 28, 1941 |
| 2,438,264 | Bender, Jr. | Mar. 23, 1948 |
| 2,438,265 | Metzner | Mar. 23, 1948 |